March 8, 1949.    R. S. HOAR ET AL    2,463,537
GUIDE FOR DIFFERENTIAL CYLINDER-PISTON ASSEMBLIES
Filed June 19, 1947    3 Sheets-Sheet 1
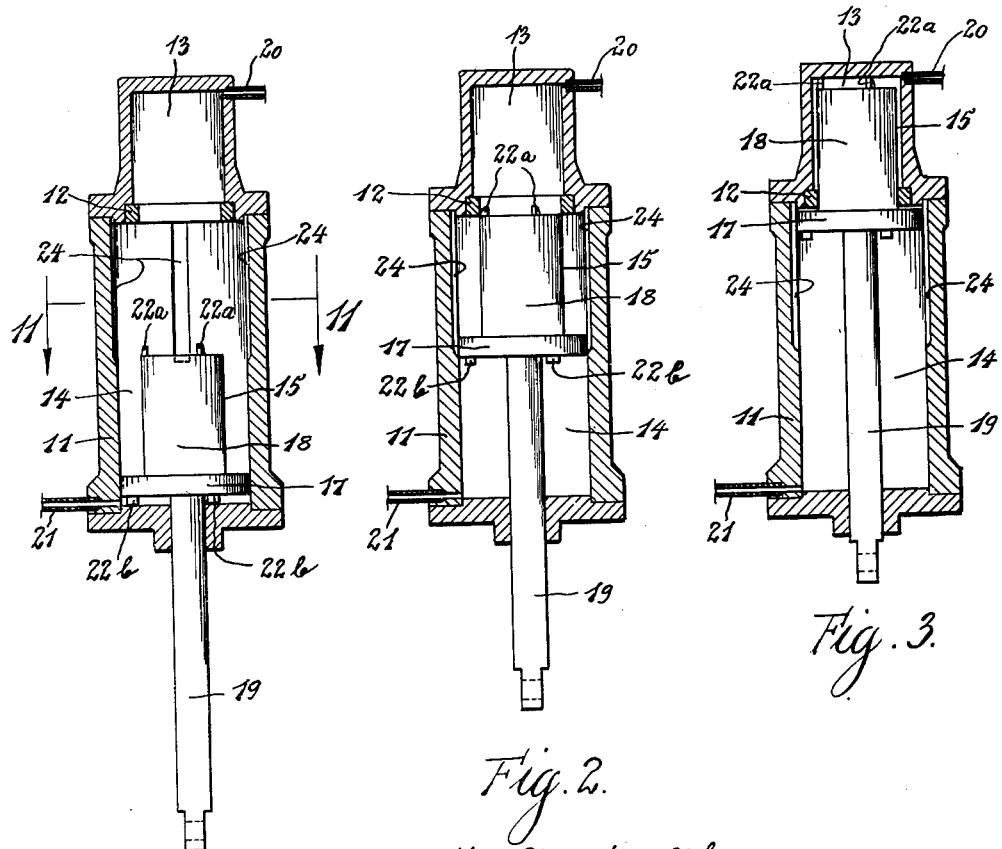
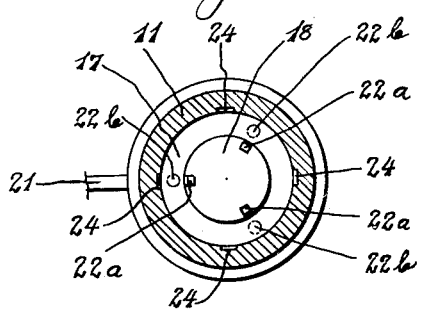
Roger Sherman Hoar,
George W. Mork,
John Adams Thierry
INVENTORS,
BY Roger Sherman Hoar
ATTORNEY.

March 8, 1949. R. S. HOAR ET AL 2,463,537
GUIDE FOR DIFFERENTIAL CYLINDER-PISTON ASSEMBLIES
Filed June 19, 1947 3 Sheets-Sheet 2

Roger Sherman Hoar,
George W. Mork,
John Adams Thierry,
INVENTORS,

BY Roger Sherman Hoar
ATTORNEY.

March 8, 1949.  R. S. HOAR ET AL  2,463,537
GUIDE FOR DIFFERENTIAL CYLINDER-PISTON ASSEMBLIES
Filed June 19, 1947  3 Sheets-Sheet 3

Roger Sherman Hoar,
George W. Mork,
John Adams Thierry
INVENTORS,

BY Roger Sherman Hoar
ATTORNEY.

Patented Mar. 8, 1949

2,463,537

UNITED STATES PATENT OFFICE 2,463,537

GUIDE FOR DIFFERENTIAL CYLINDER-PISTON ASSEMBLIES

Roger Sherman Hoar, George W. Mork, and John Adams Thierry, South Milwaukee, Wis., assignors to Bucyrus-Erie Company, South Milwaukee, Wis., a corporation of Delaware Application June 19, 1947, Serial No. 755,606

15 Claims. (Cl. 60—97)

Our invention relates to new and useful improvements in double-acting differential cylinder-piston assemblies, specifically those of the type that utilize fluid by-pass grooves on the surface of the piston and/or cylinder to effect one or more changes in the force-speed ratio of the assembly at different stages of relative travel of the piston and cylinder.

Differential cylinder-piston assemblies of this type are shown in the copending applications of George W. Mork, filed July 22, 1946, Serial No. 685,306, and John Adams Thierry, filed February 21, 1947, Serial No. 730,111, reference to which is hereby made.

In cylinder-piston assemblies of the Thierry type that have a single large-diameter cylinder chamber and piston, and adjacent thereto an auxiliary lesser-diameter cylinder chamber and piston, the auxiliary piston engages its cylinder chamber during only a portion of the stroke. Accordingly, when the assembly is built with the piston rod attached to the large-diameter piston and passing through the end of the large-diameter chamber, the piston assembly (the two pistons and the piston rod) will, during the slow-speed portion of its stroke, have guiding contact with the wall of the cylinder only at one end, namely its large diameter end. This not only makes for lateral unstability at the beginning of the compression stroke, but may result in misalignment of the auxiliary piston and its chamber with consequent damage to or stalling of the assembly as the auxiliary piston attempts to enter its chamber.

Accordingly it is the principal object of our invention to devise various means for guiding the auxiliary piston into its chamber without danger of stalling or injury to parts, without introducing leakage between chambers at different fluid pressures, and without increasing the overall length of the assembly.

In addition to our principal object, above stated, we have worked out a number of novel and useful details, which will be readily evident as the description progresses.

Our invention consists in the novel parts and in the combination and arrangement thereof, which are defined in the appended claims, and of which four embodiments are exemplified in the accompanying drawings, which are hereinafter particularly described and explained.

Throughout the description the same reference number is applied to the same member or to similar members.

Figures 1 to 3 inclusive each constitutes a longitudinal section of the first embodiment of our invention, the moveable piston assembly being shown in three successive positions, from lowest to highest, with respect to a fixed cylinder assembly.

Figures 4 to 6 inclusive each constitutes a longitudinal section of the second embodiment of our invention, the moveable piston assembly being shown in three successive positions, from lowest to highest, with respect to a fixed cylinder assembly.

Figure 8:
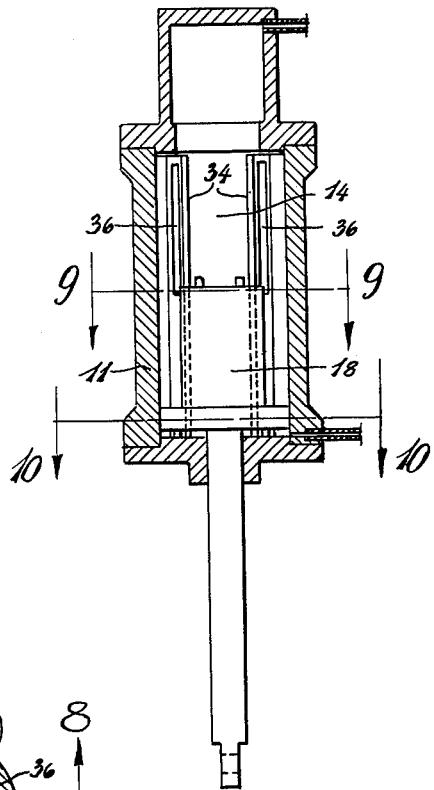
Figure 8 is a longitudinal section of the fourth embodiment of our invention, with piston assembly in lowest position with respect to the cylinder assembly, the section being taken on the line 8—8 of Figure 9.
Figure 9:
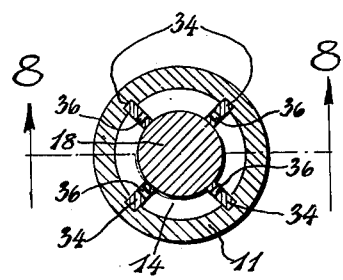
Figure 10:
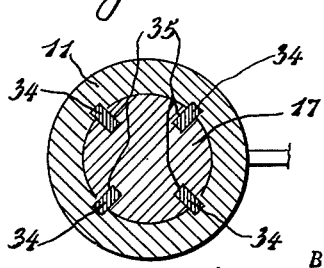

Figures 9 and 10 are cross sections taken along the lines 9—9 and 10—10 of Figure 8.

Figure 11 is a cross section taken along the line 11—11 of Figure 1.

Referring now to my first embodiment as shown in Figures 1 to 3 and 11, we see that 11 is a cylinder, having, between its ends, a constriction 12 on the inner wall thereof, dividing cylinder 11 into upper and lower chambers 13 and 14 respectively. Upper chamber 13 is shorter and smaller in diameter than lower chamber 14, to fit its piston hereinafter described.

Piston 15 consists of two parts, namely: (1) a large-diameter bottom end piece 17, forming the main low-speed piston, having sliding contact with the inside surface of chamber 14 which forms the main cylinder, and (2) a small-diameter upper portion 18, forming the auxiliary high-speed piston, having sliding contact with the inside surface of constriction 12 which forms the auxiliary cylinder.

Piston rod 19, integral with piston 15, extends downwardly through the bottom of cylinder 11.

Fluid ports 20 and 21 are provided at the top and bottom respectively of cylinder 11.

A single set of lengthwise grooves 24 on the inner surface of the upper end of chamber 14 serves to by-pass pressure fluid around main piston 17 when and only when auxiliary piston 18 is in contact with and fluid is blocked from by-passing around constriction 12, and the length of the grooves 24 and the gap between auxiliary piston 18 and constriction 12 are such that fluid is by-passed around constriction 12 when and only when it is blocked from by-passing around main piston 17. Hence for any given position of the piston 15 in cylinder 11, fluid is by-passed around only one part of the piston 15 (i. e. either the main piston 17 or the auxiliary piston 18) and is blocked from by-passing around the other.

Stops 22a and 22b at the top and bottom respectively of piston 15 prevent the ends of the piston from abutting the ends of cylinder 11 so that there will always be pressure fluid at each end of the piston at all times. These stops are preferably three in number disposed at equal intervals around the ends of the auxiliary and main pistons 18 and 17 respectively. Stops 22a on the top of the auxiliary piston also serve to guide the auxiliary piston into its chamber, and for that purpose are located on the perimeter of the piston and are bevelled inwardly at their top outer face. In this way perfect alignment of the auxiliary piston with constriction 12 is assured.

The operation of our cylinder-piston assembly is as follows:

Assume the apparatus to be in the position shown in Figure 1. Pressure fluid is admitted, through port 21, into the lower end of the interior of cylinder 11, just below piston 15. Then the fluid sets up a pressure against the cross-sectional area of main piston 17. Under the influence of this pressure, piston 15 and its piston rod 19 move upwardly slowly with great force. Meanwhile the fluid above main piston 17 passes around the upper end of auxiliary piston 18, around constriction 12, and out through port 20.

Turning now to Figure 2, when piston 15 has reached the position shown in this figure, it has uncovered grooves 24 in chamber 14 of cylinder 11. Fluid is now free to by-pass main piston 17, through grooves 24, and the effective pressure area accordingly is merely the cross-sectional area of the auxiliary piston 18, which is considerably less than the former pressure-area. Thus the piston 15, and its piston rod 19, now move upwardly considerably faster, and with considerably less force than in the first portion of the stroke. Meanwhile fluid in chamber 13 is exhausted through port 20.

This high-speed low-force travel continues until the piston 15 reaches the position shown in Figure 3.

The reverse motion is similar, initial pressure being against auxiliary piston 18 instead of main piston 17. Fluid under pressure is admitted, through port 20, into the upper chamber 13 of cylinder 11, and the exhaust from the lower chamber 14 thereof passes out through port 21.

Figure 4:
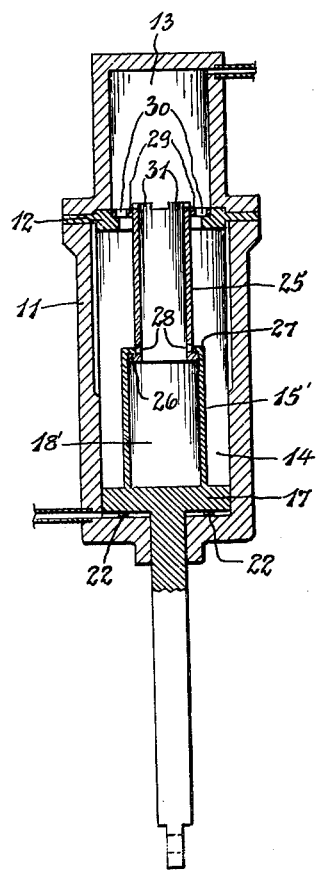
Figure 5:
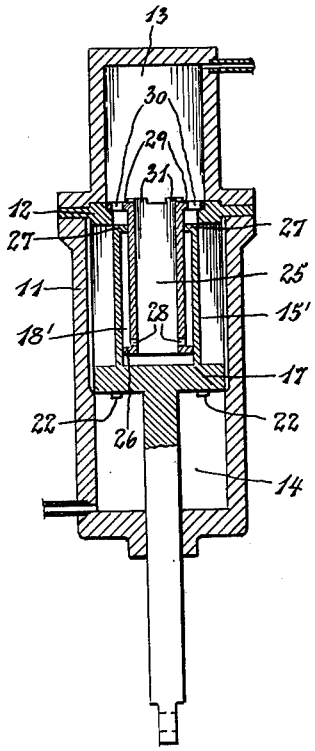
Figure 6:
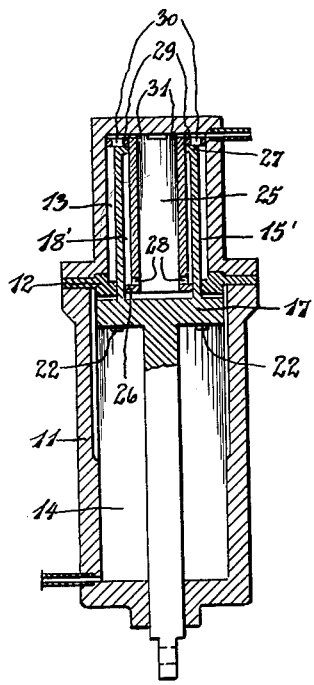

Turning now to our second embodiment, shown in Figures 4 to 6 inclusive, we see a two-speed cylinder-piston assembly similar to that of our first embodiment, except that the auxiliary portion 18' of piston 15' is now hollow and open at its upper end to receive a guide sleeve 25. Bottom collar 26 of sleeve 25 makes outwardly sliding contact with the inner surface of auxiliary piston 18' and is held inside the auxiliary piston by top collar 27 of the auxiliary piston 18' which has sliding contact at this point with the outer surface of sleeve 25. Apertures 28 in the wall of sleeve 25 prevent a vacuum from forming between the walls of sleeve 25 and piston 18' as they telescope together (Figure 5). Top collar 29 of sleeve 25 makes outwardly sliding contact with the inner surface of chamber 13. Apertures 30 provide for free passage of fluid past this collar and are preferably located therein as shown, although it is evident they could be located elsewhere on the sleeve. The sleeve is hollow and both of its ends are open to fluid in chamber 13. Thus it is seen that none of the sliding-contact surfaces above described between the sleeve 25 and the walls of chamber 13 and auxilary piston 18' need be fluid tight, since at none is there any difference in fluid pressure. The only fluid-tight contact is, as in the first embodiment, between the wall of chamber 14 and main piston 17 during the first portion of the stroke, and between constriction 12 and auxiliary piston 18' during the second portion of the stroke.

At the top of sleeve 25 there are stops 31 to prevent the sleeve from abutting the upper end of cylinder 11. Stops 22 at the bottom of piston 15' serve a similar purpose.

The assembly operates in the same manner as the first embodiment, except that guide sleeve 25 preserves the alignment of the upper end of piston 15' throughout the stroke. During the initial slow-speed part of the stroke auxiliary piston 18' passes over the sleeve 25 which is generally stationary during such initial stage (Figure 4). Shortly after the intermediate position (Figure 5), the auxiliary piston 18' passes constriction 12, engages top collar 29 of sleeve 25, and during the second part of the stroke carries the sleeve with it to the top of the cylinder (Figure 6).

In the downward stroke the sleeve 25 is generally stationary until top collar 27 on the piston engages bottom collar 26 of the sleeve and thereafter carries the sleeve downward with it.

Figure 7:
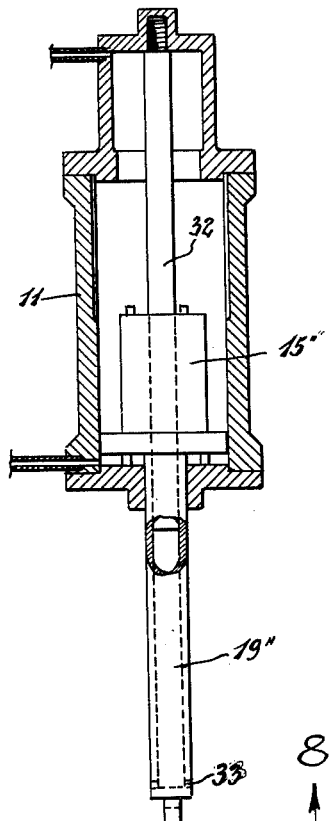
Figure 7 is a longitudinal section of the third embodiment of our invention, with piston assembly in lowest position with respect to the cylinder assembly.

Turning now to our third embodiment, shown in Figure 7, we see a two-speed cylinder-piston assembly similar to that of the first embodiment, except that the piston guide means is now a rod 32 fixed to the upper end of cylinder 11 and passing longitudinally through the center of piston 15" and hollow piston rod 19", with both of which it has at some point sliding contact which is at least some point fluid-tight. Aperture 33 in rod 19" allows air to pass in and out of the hollow rod as it is lowered and raised.

In our fourth embodiment, shown in Figures 8–10, inclusive, the piston guide means consists of longitudinal tracks 34 fixed to the inner wall of the main chamber and making sliding contact with the outer surface of auxiliary piston 18 and fluid-tight sliding contact with slots 35 in main piston 17'.

Instead of having by-pass grooves in the wall of chamber 14, slots 36 may, if desired be cut in the tracks 34.

Although four guide tracks are shown, it is evident that another number, preferably three or more may be used.

The operation of this embodiment is similar to that of the first embodiment.

Having now described and illustrated four forms of our invention, we wish it to be understood that our invention is not to be limited to the specific forms or arrangements of parts herein described and shown.

We claim:

1. In a cylinder-piston assembly, the combination of: a main cylinder and piston therefor, having a relatively large effective pressure area; an auxiliary cylinder and piston therefor, having a relatively small effective pressure area; a piston-rod; means operatively connecting the piston-rod to the main and auxiliary pistons, the piston-rod and auxiliary piston being adjacent opposite faces of the main piston; and the auxiliary piston being within its cylinder during a high-speed stage of travel of the piston-rod, and outside thereof during a low-speed stage; means to by-pass fluid around the main piston during said high-speed stage whereby the operating speed of the assembly is automatically increased upon entering said high-speed stage; and guide means to guide the auxiliary piston into its cylinder upon entering said high-speed stage.

2. A cylinder-piston assembly according to claim 1, further characterized by the fact that the guide means consists of at least one guide rod within and anchored to one of the cylinders, and that the auxiliary piston has sliding contact with said guide rod as it enters said high-speed stage.

3. A cylinder-piston assembly according to claim 2, further characterized by the fact that the guide rod is centrally disposed within the cylinder to which it is anchored and that the auxiliary piston has fluid-tight inwardly sliding contact with said guide rod.

4. A cylinder-piston assembly according to claim 3, further characterized by the fact that the piston rod is hollow, that the guide rod extends into said piston-rod, which has fluid-tight inwardly sliding contact with the outer surface of said guide rod.

5. A cylinder-piston assembly according to claim 1, further characterized by the fact that the guide means consists of a plurality of guide vanes fixed to the interior wall of the main cylinder and having sliding contact with the auxiliary piston as it enters said high-speed stage.

6. A cylinder-piston assembly according to claim 5, further characterized by the fact that the auxiliary piston has fluid-tight outwardly sliding contact with the interior surface of its cylinder during said high-speed stage, and that the main piston has fluid-tight outwardly sliding contact with the interior surface of its cylinder and with the surface of the guide vanes during said low-speed stage.

7. A cylinder-piston assembly according to claim 6, further characterized by the fact that the fluid by-pass means consists of at least one longitudinal slot in at least one of the guide vanes, which slot is uncoverable by relative motion of the main piston and the main cylinder.

8. A cylinder-piston assembly according to claim 1, further characterized by the fact that the auxiliary piston is hollow and that the guide means consists of a guide sleeve that is slidably constrained adjacent one end to move within the auxiliary cylinder along the axis of the auxiliary cylinder and is slidably constrained adjacent the other end to move within the auxiliary piston along the axis of the auxiliary piston.

9. A cylinder-piston assembly according to claim 8, further characterized by the fact that the guide sleeve has at one end outwardly sliding contact with a cylindrical surface about the axis of the auxiliary cylinder and has at the other end outwardly sliding contact with the interior surface of the auxiliary piston.

10. A cylinder-piston assembly according to claim 9, further characterized by the fact that the auxiliary piston has adjacent its head inwardly sliding contact with the exterior surface of the guide sleeve.

11. A cylinder-piston assembly according to claim 10, further characterized by having means to by-pass fluid past the points of sliding contact between the guide sleeve and the auxiliary piston and between the guide sleeve and said cylindrical surface.

12. A cylinder-piston assembly according to claim 1, further characterized by the fact that the auxiliary piston is hollow, that the guide means consists of a guide sleeve slidably constrained adjacent one end to move within the auxiliary cylinder along the axis of the auxiliary cylinder, and that the auxiliary piston is adjacent its head slidably constrained by the guide sleeve to move along the axis of said guide sleeve.

13. A cylinder-piston assembly according to claim 12, further characterized by the fact that the guide sleeve has at one end outwardly sliding contact with a cylindrical surface about the axis of the auxiliary cylinder, and that the auxiliary piston has adjacent its head inwardly sliding contact with the exterior surface of the guide sleeve.

14. A cylinder-piston assembly according to claim 13, further characterized by having means to by-pass fluid past the points of sliding contact between the guide sleeve and the auxiliary piston and between the guide sleeve and said cylindrical surface.

15. A cylinder-piston assembly according to claim 1, further characterized by the fact that the guide means consists of a guide sleeve that is slidably constrained adjacent one end to move along the axis of the auxiliary cylinder and that the auxiliary piston is constrained by the sleeve to move along said axis as it enters said high-speed stage.

ROGER SHERMAN HOAR.
GEORGE W. MORK.
JOHN ADAMS THIERRY.

No references cited